(12) United States Patent
Tanaka

(10) Patent No.: US 9,087,255 B2
(45) Date of Patent: Jul. 21, 2015

(54) IMAGE PROCESSOR, IMAGE PROCESSING METHOD AND PROGRAM, AND RECORDING MEDIUM

(71) Applicant: OMRON Corporation, Kyoto-shi, Kyoto (JP)

(72) Inventor: Kiyoaki Tanaka, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 14/191,883

(22) Filed: Feb. 27, 2014

(65) Prior Publication Data

US 2014/0307125 A1    Oct. 16, 2014

(30) Foreign Application Priority Data

Apr. 15, 2013    (JP) ................................. 2013-085089

(51) Int. Cl.
*H04N 5/232* (2006.01)
*G06K 9/62* (2006.01)
*G06K 9/20* (2006.01)

(52) U.S. Cl.
CPC .............. *G06K 9/2054* (2013.01); *H04N 5/232* (2013.01)

(58) Field of Classification Search
CPC .......................... H04N 5/232; G06K 9/00362
USPC .......................... 348/231.2; 382/190; 345/619
See application file for complete search history.

(56) References Cited

U.S. PATENT DOCUMENTS

| | | | |
|---|---|---|---|
| 2010/0007763 A1 | 1/2010 | Yokohata | |
| 2010/0149369 A1 | 6/2010 | Yasuda | |
| 2011/0087677 A1 | 4/2011 | Yoshio et al. | |
| 2013/0069978 A1* | 3/2013 | Tanaka et al. | 345/619 |

FOREIGN PATENT DOCUMENTS

| | | |
|---|---|---|
| JP | 2008-288882 A | 11/2008 |
| JP | 2009-049476 A | 3/2009 |
| JP | 2010-021885 A | 1/2010 |
| JP | 2010-062613 A | 3/2010 |

OTHER PUBLICATIONS

Extended European Search Report issued in corresponding European Application No. 14154940.2, mailed on Mar. 3, 2015 (14 pages).

* cited by examiner

*Primary Examiner* — Joel Fosselman
(74) *Attorney, Agent, or Firm* — Osha Liang LLP

(57) ABSTRACT

An image processor has an image input section that receives image data output from an imaging unit for imaging a subject, the image data including the subject, a position information acquisition section that acquires position information indicating a current position, an object recognition section that recognizes the subject in the image data input from the image input section, and an attention object list management section that manages, for each position upon photographing, a first attention object list including first attention object data indicating an attention object candidate selected from among the subjects recognized in the image data that is previously photographed at the position upon photographing.

20 Claims, 9 Drawing Sheets

FIG. 5A

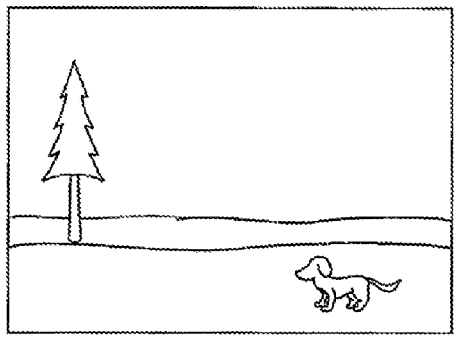

PHOTOGRAPHED AT NISHI-KUSATSU, KUSATSU-SHI, SHIGA

FIG. 5B

| PHOTOGRAPHING HISTORY LIST | |
|---|---|
| NISHI-KUSATSU, KUSATSU-SHI, SHIGA | DOG, TREE |
| NISHI-KUSATSU, KUSATSU-SHI, SHIGA | DOG, PERSON A |
| NISHI-KUSATSU, KUSATSU-SHI, SHIGA | DOG, PERSON A, CAR |
| SHIOKOJI-DORI, SHIMOGYOU-KU, KYOTO-SHI | CAR, CAT |
| KOUNAN, MINATO-KU, TOKYO | PERSON B, PERSON C |
| ⋮ | ⋮ |

FIG. 5C

| ATTENTION OBJECT LIST | |
|---|---|
| NISHI-KUSATSU, KUSATSU-SHI, SHIGA | DOG > PERSON A > CAR, TREE ... |
| SHIOKOJI-DORI, SHIMOGYOU-KU, KYOTO-SHI | CAR > CAT |
| KOUNAN, MINATO-KU, TOKYO | PERSON B > PERSON C |
| ⋮ | ⋮ |

FIG. 5D

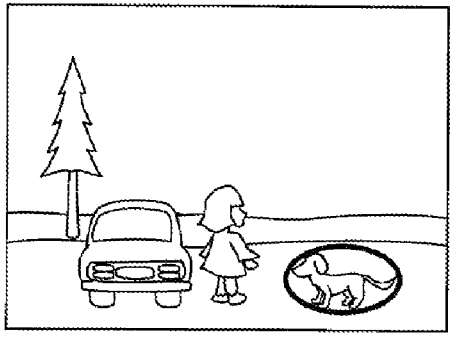

PHOTOGRAPHED AT NISHI-KUSATSU, KUSATSU-SHI, SHIGA

FIG. 10

ATTENTION OBJECT DATA A

| NISHI-KUSATSU, KUSATSU-SHI, SHIGA | PERSON A > PERSON B > PERSON C |
|---|---|

| | UPON PHOTOGRAPHING | SUBJECT | ATTENTION OBJECT |
|---|---|---|---|
| (1) | NISHI-KUSATSU, KUSATSU-SHI, SHIGA | PERSON A, PERSON B, PERSON C | PERSON A |
| (2) | NISHI-KUSATSU, KUSATSU-SHI, SHIGA | PERSON A, PERSON C | PERSON A |
| (3) | NISHI-KUSATSU, KUSATSU-SHI, SHIGA | PERSON B, PERSON C | PERSON B |
| (4) | NISHI-KUSATSU, KUSATSU-SHI, SHIGA | PERSON A, PERSON B, PERSON C | PERSON A |
| (5) | NISHI-KUSATSU, KUSATSU-SHI, SHIGA | PERSON B, PERSON C | PERSON B |
| (6) | NISHI-KUSATSU, KUSATSU-SHI, SHIGA | PERSON A, PERSON B, PERSON C | PERSON A |
| (7) | NISHI-KUSATSU, KUSATSU-SHI, SHIGA | PERSON A, PERSON B, PERSON C, PERSON D | PERSON A, PERSON D |

FIG. 11

| PHOTOGRAPHING HISTORY LIST | | |
|---|---|---|
| | NISHI-KUSATSU, KUSATSU-SHI, SHIGA | DOG, TREE |
| | NISHI-KUSATSU, KUSATSU-SHI, SHIGA | DOG, PERSON A |
| | NISHI-KUSATSU, KUSATSU-SHI, SHIGA | DOG, PERSON A, CAR |
| FACILITY A | SHIOKOJI-DORI, SHIMOGYOU-KU, KYOTO-SHI | CAR, CAT |
| FACILITY B | KOUNAN, MINATO-KU, TOKYO | PERSON B, PERSON C |
| ⋮ | ⋮ | ⋮ |
| FACILITY A | OSAKA ・・・・ | CAR |
| ⋮ | ⋮ | ⋮ |
| FACILITY B | OKAYAMA ・・・・ | PERSON B |

FIG. 12

| FACILITY A | CAR, CAT |
|---|---|
| FACILITY B | PERSON B > PERSON C |
| ⋮ | ⋮ |

IMAGE PROCESSOR, IMAGE PROCESSING METHOD AND PROGRAM, AND RECORDING MEDIUM

BACKGROUND

1. Field

The present invention relates to an image processor, an image processing method, an image processing program, and a recording medium.

2. Related Art

There is known a technology for providing a photographer with information concerning a location suitable for photographing or for guiding him or her to the photographing location. For example, Japanese Unexamined Patent Publication No. 2008-288882 is known as the photographing location guiding technology.

Japanese Unexamined Patent Publication No. 2008-288882 discloses a photographing system that selects predetermined sample images associated with a photographed image and arranges and displays photographing locations of the selected sample images in a predetermined photographing order to allow a user to efficiently visit a plurality of places. This publication also discloses that the sample images are displayed together with the photographing locations.

The above conventional technology can identify the same subject as that appears in each of the sample images as an attention object. However, a photograph taken by a user generally includes the subject appearing in the sample images and other subjects, that is, there may be a case where the user wants to take photographs focusing on a subject other than that appearing in the sample images. In this case, the system of the above conventional technology cannot recognize the subject other than that appearing in the sample images as the attention object. Thus, in order to identify the subject other than that appearing in the sample images as the attention object, the user needs to perform operation of, e.g., specifying, with his or her finger, a subject to be set as the attention object on a screen displaying a through image, as it is conventionally known.

SUMMARY

One or more embodiments of the present invention provides an image processor, an image processing method, an image processing program, and a recording medium capable of grasping an attention object.

In accordance with one or more embodiments of the present invention, there is provided an image processor including: an image input section configured to receive image data output from an imaging unit for imaging a subject, the image data including the subject; a position information acquisition section configured to acquire position information indicating a current position; an object recognition section configured to recognize the subject in the image data input from the image input section; an attention object list management section configured to manage, for each position upon photographing, a first attention object list including first attention object data indicating an attention object candidate selected from among the subjects recognized in the image data that has previously been photographed at the position upon photographing; an attention object identification section configured to perform comparison processing of comparing the first attention object data corresponding to a position indicated by the position information acquired by the position information acquisition section and subject recognized by the object recognition section and to identify, when the subject and attention object candidate coincide with each other, the subject coinciding with the attention object candidate as an attention object; and an attention object output section configured to output information for identifying, on an image, the attention object identified by the attention object identification section.

With the above configuration, when the subject and attention object candidate coincide with each other in the above comparison, the subject coinciding with the attention object candidate is identified as the attention object. When a current position is the same as a position that has previously been photographed, and the subjects to be photographed by a user include a subject as that has previously been photographed, it is likely that the subject that the user photographs is the same as that has previously been photographed. Thus, by identifying the same subject as that has previously been photographed at the past position as the attenuation object, it is highly likely that the subject that the user pays attention to and photographs can be identified. Thus, there can be provided an image processor capable of grasping the attention object.

Further, in the image processor according to one or more embodiments of the present invention, when selecting, as the attention object candidate, a plurality of the subjects from among all the subjects recognized in previously photographed image data, the attention object list management section assigns priorities to each of the attention object candidates for management, and the priority is set based on the number of times of recognition indicating the number of times that the subject is recognized in the previously photographed image data.

With the above configuration, it is highly likely that a subject to be photographed by the user is the same as a subject that has previously been photographed at the past position, so that by identifying the same subject as that has previously been photographed at the past position as the attenuation object, a possibility of identifying the subject that the user pays attention to and photographs can be identified.

Further, in the image processor according to one or more embodiments of the present invention, the attention object list management section adjusts the number of times of recognition in accordance with attention degree determined by at least one of a state of the subject and frequency of appearance of the subject and sets the priority based on the adjusted number of times of recognition.

With the above configuration, it is possible to enhance accuracy of identifying the attention object.

Further, in the image processor according to one or more embodiments of the present invention, when there exist a plurality of the subjects each coincide with the attention object candidate of the first attention object data as a result of the comparison, the attention object identification section identifies, as the attention object, a plurality of the subjects that coincide with a top predetermined number of attention object candidates in terms of the priority.

Further, in the image processor according to one or more embodiments of the present invention, when there is no first attention object data corresponding to the position indicated by the position information acquired by the position information acquisition section, the attention object identification section performs, as the comparison processing, processing of comparing the first attention object data corresponding to a position near the position indicated by the position information and subject recognized by the object recognition section and identifies, when the attention object candidate included in the first attention object data coincides with subject, the subject coinciding with the attention object candidate as the attention object.

With the above configuration, when a user takes photographs at a position near a past photographing position, it is highly likely that he or she photographs the same subject as that has previously been photographed at the past position. Thus, by identifying the same subject as that has previously been photographed at the past position as the attenuation object, it is highly likely that the subject that the user pays attention to and photographs can be identified.

Further, in the image processor according to one or more embodiments of the present invention, when there exit subjects that coincide and do not coincide with the attention object candidate as a result of the comparison processing, the attention object identification section identifies, as the attention object, a subject that does not coincide with the attention object candidate in addition to a subject having the highest priority of among a plurality of subjects that coincide with the attention object candidate.

With the above configuration, it is possible to identify, as the attention object, also a subject that has not been previously photographed at the same position as the past position.

Further, in the image processor according to one or more embodiments of the present invention, the attention object list management section acquires an another user attention object list including position-based another user attention object data generated by another image processor and manages a combined attention object list obtained by combining the acquired another user attention objet list and the first attention object list, and when the combined attention object list is selected according to a user instruction, the attention object identification section performs, as the comparison processing, processing of comparing the combined attention object data corresponding to a position indicated by the position information acquired by the position information acquisition section and subject recognized by the object recognition section.

With the above configuration, it is possible to identify, as the attention object, a subject in common between two users, the subject having been previously photographed frequently at the past same position.

Further, in the image processor according to one or more embodiments of the present invention, the attention object list management section combines the another user attention object list and first attention object list after excluding a predetermined attention object candidate from the another user attention object list.

With the above configuration, it is possible to enhance accuracy of identifying, as the attention object, a subject in common between two users that has been previously photographed frequently at the past same position.

Further, in the image processor according to one or more embodiments of the present invention, the position information indicates a predetermined range centering on a position identified by a latitude and a longitude.

Further, in the image processor according to one or more embodiments of the present invention, the position information is indicated by a predetermined administrative section.

Further, in the image processor according to one or more embodiments of the present invention, the position information acquisition section acquires, in addition to the position information, facility information indicating a facility existing at a position indicated by the position information, when the position information acquisition section acquires the facility information, the attention object list management section manages, for each facility information, a second attention object list including second attention object data indicating an attention object candidate selected from among the subjects recognized in the image data that has previously been photographed at a position corresponding to the facility, and when the position information acquisition section acquires the facility information, the attention object identification section performs, as the comparison processing, processing of comparing the second attention object data corresponding to the facility information and subject recognized by the object recognition section.

With the above configuration, when the subjects to be photographed by a user at a facility of the same type as that at which the user takes photographs include an object that has previously been photographed, it is likely that the subject that the user pays attention to and photographs is the same as a subject that has previously been photographed at the past position. Thus, by identifying the same subject as that has previously been photographed at the past position as the attenuation object, it is highly likely that the subject that the user pays attention to and photographs can be identified. Thus, the attention object can be grasped.

In accordance with one or more embodiments of the present invention, there is provided an image processing method including: an image input step of receiving image data output from an imaging unit for imaging a subject; a position information acquisition step of acquiring position information indicating a current position; an object recognition step of recognizing the subject in the image data input in the image input step; an attention object list management step of managing, for each position upon photographing, a first attention object list including first attention object data indicating an attention object candidate selected from among the subjects recognized in the image data that has previously been photographed at the position upon photographing; an attention object identification step of performing comparison processing of comparing the first attention object data corresponding to a position indicated by the position information acquired in the position information acquisition step and subject recognized in the object recognition step and to identify, when the subject and attention object candidate coincide with each other, the subject coinciding with the attention object candidate as an attention object; and an attention object output step of outputting information for identifying, on an image, the attention object identified in the attention object identification step.

With the above configuration, there can be provided an image processing method capable of grasping the attention object.

The image processor according to one or more embodiments of the present invention may be realized by a computer. In this case, an image processing program for image processor that realizes the above image processor using the computer by allowing the computer to function as respective elements of the image processor and a computer-readable recording medium recording the program are encompassed in the technical scope of the present invention.

One or more embodiments of the present invention grasps the attention object.

BRIEF DESCRIPTION OF THE DRAWINGS

FIGS. 5A, 5B, 5C, and 5D are views illustrating an example of a flow of attention object output processing;

FIG. 10 is a view explaining a photographed subject and a subject identified as the attention object;

FIG. 11 is a view explaining an example of the photographing history data in the second embodiment;

FIG. 12 is a view explaining an example of the attention object data in the second embodiment.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
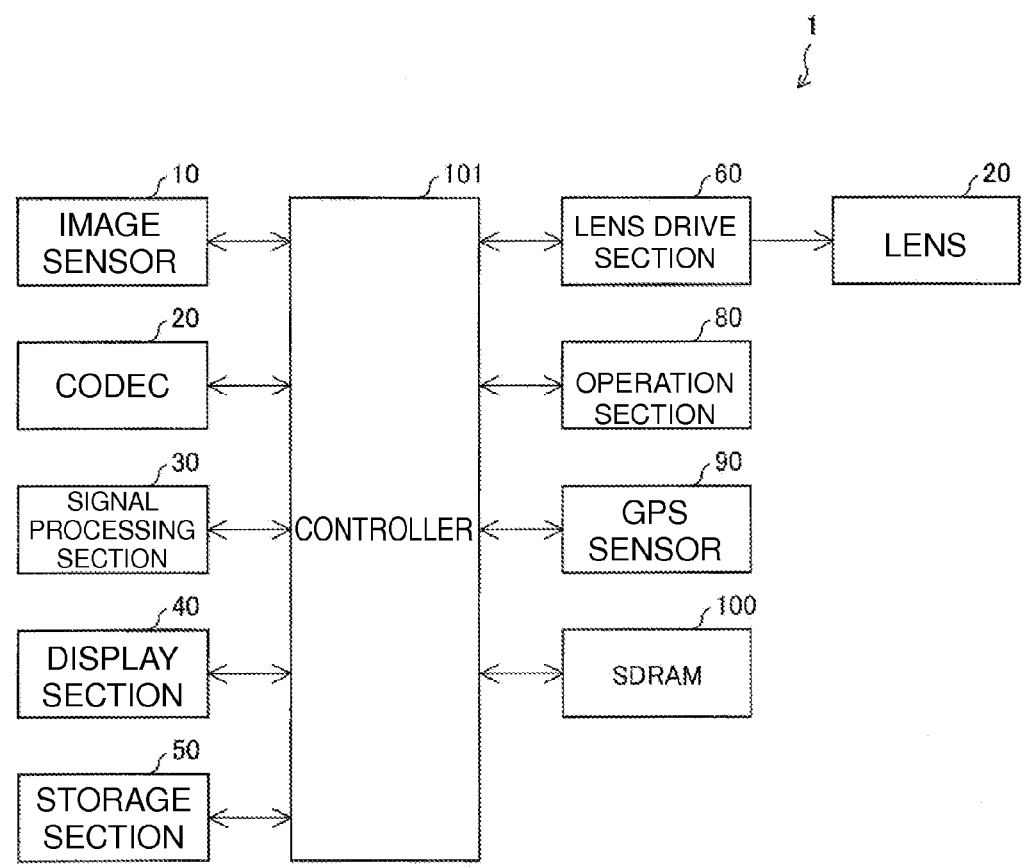
FIG. 1 is a block diagram illustrating an outline of a configuration of an imaging device according to embodiments of the present invention.

FIG. 1 is a block diagram illustrating an outline of a configuration of an imaging device according to embodiments of the present invention. As illustrated in FIG. 1, an imaging device 1 includes a controller 101 that controls the entire operation of the imaging device 1, an image sensor 10, a codec 20, a signal processing section 30, a display section 40, a storage section 50, an SDRAM, a lens section 70 including a focus lens and a zoom lens, a lens drive section 60 that drives the lens section 70, an operation section 80, and a GPS sensor 90. The storage section 50 is configured to store programs to be executed by the controller 101, to be used as a working area of the controller 101, and to store data.

The lens section 70 is controlled by the lens drive section 60 and is housed inside a body of the imaging device 1 when the imaging device 1 is not activated. The lens section 70 performs focusing by moving the focus lens. The lens section 70 has a zoom mechanism for adjusting the zoom lens, and the lens drive section 60 changes a zoom amount of the lens section 70.

The image sensor 10 is a photoelectric conversion element such as a CCD image sensor or a CMOS image sensor. The image sensor 10 photoelectric-converts an optical image of a subject formed on an imaging surface through the lens section 70 and outputs obtained image data to the signal processing section 30.

The CCD image sensor outputs an analog signal, so that when the CCD sensor is used as the image sensor 10, a not illustrated analog-digital conversion section is used to convert the analog signal output from the CCD image sensor into digital image data.

The signal processing section 30 applies various signal processing to the image data output from the image sensor 10 to convert the image data into data of a YUV format. Further, the signal processing section 30 stores the YUV-format image data in the SDRAM.

The controller 101 converts the YUV-format image data stored in the SDRAM into RGB-format image data and displays the obtained RGB-format data on the display section 40. As a result, a through image is displayed on the display section 40.

The codec 20 is configured to, under control of the controller 101, read out the YUV-format image data stored in the SDRAM, then to apply compression coding to the YUV-format image data, and to store coded data obtained as a result of the compression coding, in the storage section 50. When storing a moving image, the codec 20 applies compression coding to a plurality of frames according to an MPEG compression method. In this case, audio data input through a microphone is synchronized with moving picture data in an AV synchronization.

The operation section 80 includes a plurality of keys including a shutter button and is configured to receive user's operation. When a user presses halfway the shutter button provided in the operation section 80, a focusing instruction is output to the controller 101, while when the user presses the shutter button fully, an imaging signal indicating that imaging is instructed is output to the controller 101.

The GPS sensor 90 receives radio waves from a GPS satellite and outputs a GPS signal indicating a current position on a map to the controller 101.

Figure 2:
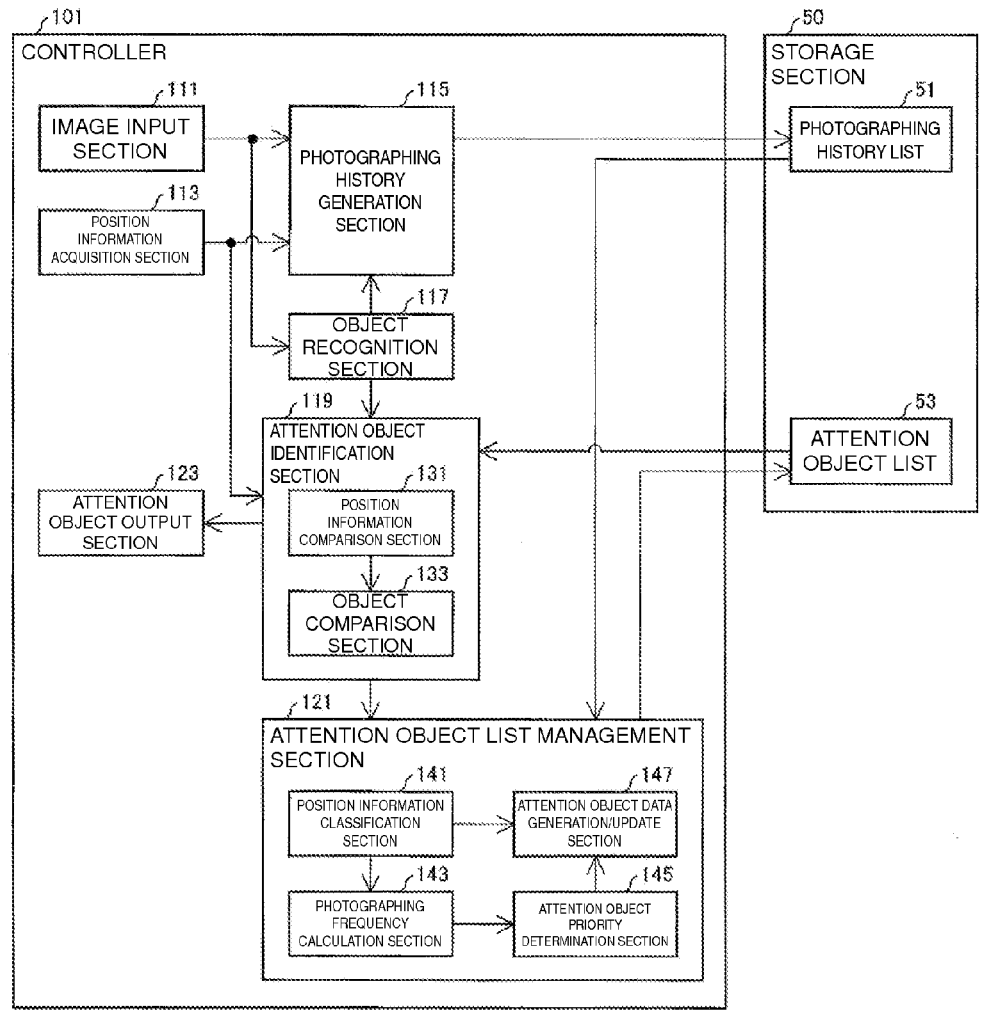
FIG. 2 is a block diagram illustrating, together with data stored in a storage section, an example of functions of a controller provided in the imaging device according to a first embodiment.

FIG. 2 is a block diagram illustrating, together with data stored in a storage section, an example of functions of a controller provided in the imaging device according to the first embodiment. As illustrated in FIG. 2, the controller 101 includes an image input section 111, a position information acquisition section 113, a photographing history generation section 115, an object recognition section 117, an attention object identification section 119, an attention object list management section 121, and an attention object output section 123.

The image input section 111 controls the image sensor 10 to receive the image data input from the image sensor 10. Before input of the imaging signal from the operation section 80, the image input section 111 outputs the through image to the object recognition section 117. Upon receiving the imaging signal from the operation section 80, the image input section 111 controls the codec 20 to apply coding to the image data stored in the SDRAM and stores coded data of a still image obtained as a result of compression coding performed by the codec 20 in the storage section 50.

The object recognition section 117 recognizes a subject included in the through image input from the image input section 111 input at a predetermined time interval. The subject recognition can be achieved using a known general object recognition method. For example, in one method, a feature point is extracted from the through image input from the image input section 111, and a comparison (pattern matching) between the feature point and data associated with previously stored feature point data and type information of an object represented by the feature point data is performed. Alternatively, a comparison between color data included in the through image and data obtained by associating previously described color data with type information of an object represented by the color data may be performed. Further, the above two methods can be combined for the object recognition.

The object recognition section 117 outputs subject identification information of the subject recognized in the through image input from the image input section 111 to the attention object identification section 119. The subject identification information includes one of the feature point data and color data of the subject and type information indicating a type of the subject.

In a case where the subject is a person, a distinction may be made between one person to another. In this case, registration data previously associated with individual identification information (e.g., name) and feature point data indicating face feature points can be used to make the distinction. That is, the object recognition section 117 compares the feature point data of the subject and registration data, thereby identifying an individual. When identifying the individual, the object recognition section 117 acquires the subject identification information including the individual identification information of the subject as the type information.

When recognizing a plurality of subjects in the through image input from the image input section 111, the object recognition section 117 outputs the subject identification information of each of the plurality of recognized subjects to the attention object identification section 119. Further, upon receiving the imaging signal from the operation section 80, the object recognition section 117 outputs, to the photographing history generation section 115, the subject identification information of a subject recognized in image data upon receiving the imaging signal.

The position information acquisition section 113 controls the GPS sensor 90 to acquire the GPS signal output from the GPS sensor 90. The position information acquisition section 113 outputs, as position information, the GPS signal input from the GPS sensor 90 to the attention object identification section 119. Further, upon receiving the imaging signal from the operation section 80, the position information acquisition section 113 outputs, to the photographing history generation section 115, position information at that point of time.

The position information acquisition section 113 may identify, e.g., an address, a latitude, and a longitude, based on the position indicated by the GPS signal and set the address, latitude, and longitude as the position information. When the latitude and longitude are used as the position information, a tolerance is set centering a position identified by the latitude and longitude. When the address is used as the position information, administrative section, such as "city", "town", or "prefectural and city governments" may be identified according to user setting.

Figure 3:
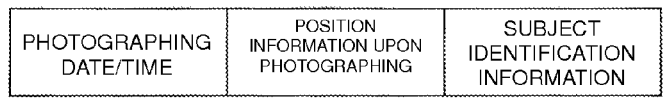
FIG. 3 is a view illustrating an example of a format of photographing history data.

The photographing history generation section 115 generates, upon receiving the imaging signal from the operation section 80, photographing history data by using at least the subject identification information of the subject input from the object recognition section 117 and position information input from the position information acquisition section 113 and adds the generated photographing history data to a photographing history list 51 stored in the storage section 50. The photographing history data represents a history of the photographing and includes, as illustrated in FIG. 3, a photographing history record associating photographing date/time, position information upon photographing, and subject identification information.

The photographing history record includes an item of the photographing date/time indicating date/time at which an imaging instruction is issued, an item of the position information upon photographing indicating information of a photographing position at a photographing time set in the item of the photographing date/time, and an item of the subject identification information indicating the subject identification information of a subject at a photographing time set in the item of the photographing date/time. The photographing history record is stored in the photographing history list 51. When a plurality of subjects are recognized, the photographing history record can set therein a plurality of pieces of subject identification information.

The attention object identification section 119 refers to an attention object list 53 to be described later and compares attention object data corresponding to a current photographing position indicated by position information acquired by the position information acquisition section 113 and a subject recognized by the object recognition section 117. When the subject and an attention object candidate included in the attention object data coincide with each other, the attention object identification section 119 identifies the subject coinciding the attention object candidate as an attention object. Further, upon receiving the imaging signal from the operation section 80, the attention object identification section 119 outputs an attention object list entry instruction including photographing date/time to the attention object list management section 121.

Figure 4:
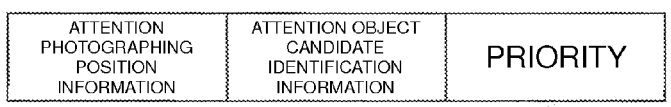
FIG. 4 is a view illustrating an example of a format of attention object data.

The attention object data is data for identifying an attention subject preferentially in the through image and is generated based on the photographing history data. As illustrated in FIG. 4, the attention object data includes an attention object record associating attention photographing position information, attention object candidate identification information, and priority.

The attention object data includes an item of the attention photographing position information, an item of the attention object candidate identification information, and an item of the priority. In the item of the attention photographing position information, the position information upon photographing included in the photographing history data is set as a single attribute. In the item of the attention object candidate identification information, the subject identification information associated with the position information upon photographing is set. When a plurality of pieces of subject identification information are set in the item of the attention object candidate identification information, priority orders determined for respective pieces of subject identification information are set in the item of the priority. Details of the attention data will be described later.

The attention object identification section 119 includes a position information comparison section 131 and an object comparison section 133 and performs comparison processing therebetween. The position information comparison section 131 determines whether or not there exists, in the attention object list 53 stored in the storage section 50, attention object data including the same attention photographing position information as a current photographing position indicated by the position information acquired by the position information acquisition section 113.

When determining that there exists the attention object data including the same attention photographing position information as a current photographing position in the attention object list 53, the position information comparison section 131 extracts the attention object data from the attention object list 53 and outputs the extracted attention object data to the object comparison section 133.

The object comparison section 133 determines, based on the attention object data input from the position information comparison section 131, whether or not a subject recognized by the object recognition section 117 is the attention object. Specifically, the object comparison section 133 compares the attention object candidate identification information included in the attention object data input from the position information comparison section 131 and subject identification information of the subject input from the object recognition section 117.

The object comparison section 133 determines, as the attention object, a subject indicated by the subject identification information coinciding with the attention object candidate identification information included in the attention object data. When a plurality of pieces of attention object candidate identification information are included in the attention object data and when there exist a plurality of pieces of subject identification information coinciding with the attention object candidate identification information, the object comparison section 133 determines, as the attention object, a subject identified by subject identification information with the highest priority among the plurality of pieces of subject identification information coinciding with the attention object candidate identification information. The object comparison section 133 outputs the subject identification information of the subject identified as the attention object to the attention object output section 123.

The attention object output section 123 outputs attention object identification information for identifying, on an image, the subject determined as the attention object by the object comparison section 133. The attention object identification information includes the subject identification information of a subject determined as the attention object and attention object position information indicating a position of the subject on the image.

The attention object list management section 121 manages the attention object list stored in the storage section 50. Specifically, upon receiving the attention object list entry instruction from the attention object identification section 119, the attention object list management section 121 generates/updates the attention object data. The attention object list management section 121 includes a position information classification section 141, a photographing frequency calculation section 143, an attention object priority determination section 145, and an attention object data generation/update section 147.

The position information classification section 141 classifies the photographing history data for each position information upon photographing. Specifically, the position information classification section 141 extracts, from the photographing history list 51 stored in the storage section 50, the photographing history data of date/time included in the entry instruction as a processing target, then refers to the attention object list 53, and compares the position information upon photographing included in the extracted photographing history data and the attention object list 53. When there exists attention object data including the same attention photographing position information as the position information upon photographing included in the photographing history data that is a processing target, the position information classification section 141 includes, as an update target, the attention object data in an update instruction and outputs the update instruction to the attention object data generation/update section 147. At the same time, the position information classification section 141 includes the position information upon photographing included in the processing target photographing history data in a photographing frequency calculation instruction at update time and outputs the photographing frequency calculation instruction at update time to the photographing frequency calculation section 143.

On the other hand, when there is no attention object data including the same attention photographing position information as the position information upon photographing included in the processing target photographing history data, the position information classification section 141 outputs a generation instruction including the processing target photographing history data to the attention object data generation/update section 147. At the same time, the position information classification section 141 includes, in a photographing frequency calculation instruction at generation time, the position information upon photographing included in the processing target photographing history data and outputs the photographing frequency calculation instruction at generation time to the photographing frequency calculation section 143.

The photographing frequency calculation section 143 calculates the number of time of photographing for each subject in response to an instruction from the position information classification section 141. Upon receiving the photographing frequency calculation instruction at update time from the position information classification section 141, the photographing frequency calculation section 143 extracts all the photographing history data including the position information upon photographing from the photographing history list stored in the storage section 50 and sets each extracted photographing history data as a processing target.

The photographing frequency calculation section 143 calculates the number of times of photographing performed for the same subject based on the processing target photographing history data. Specifically, the photographing frequency calculation section 143 determines that the same subject has the same subject identification information, and the photographing frequency calculation section 143 calculates, as the number of times of photographing, the number obtained by increasing a count value by 1 every time coincidence of the subject identification information is found. The photographing frequency calculation section 143 calculates the number of times of photographing, generates, for each subject identification information, a photographing frequency set including the subject identification information and the number of times of photographing, and outputs a priority determination instruction including the generated photographing frequency set to the attention object priority determination section 145.

Further, upon receiving the photographing frequency calculation instruction at generation time from the position information classification section 141, the photographing frequency calculation section 143 generates, for each subject identification information, a photographing frequency set including the subject identification information and the number "1" of times of photographing, and outputs a priority determination instruction including the generated photographing frequency set to the attention object priority determination section 145.

The photographing frequency calculation section 143 may store the cumulative number of times of photographing for each subject identification information. In this case, the photographing frequency calculation section 143 adds, every update, the number "1" of times of photographing to the cumulative number of times of photographing in the updated subject identification information.

The attention object priority determination section 145 determines the priority among the attention object candidates. Specifically, the attention object priority determination section 145 assigns a higher priority to the photographing frequency set with a larger number of times of photographing calculated by the photographing frequency calculation section 143. The attention object priority determination section 145 generates a priority set including the subject identification information included in the photographing frequency set and the priority assigned to the photographing frequency set and outputs the generated priority set to the attention object data generation/update section 147.

However, when receiving a priority determination instruction in which all the photographing frequency sets have the number "1" of the times of photographing, the attention object priority determination section 145 outputs information indicating that no priority exists, to the attention object data generation/update section 147.

The attention object data generation/update section 147 receives an update instruction and the priority set from the position information classification section 141 and attention object priority determination section 145, respectively, and then updates the attention object data identified by the update instruction.

Further, upon receiving the generation instruction from the position information classification section 141, the attention object data generation/update section 147 newly generates the attention object data and adds the newly generated attention object data to the attention object list 53 stored in the storage section 50. The position information upon photographing and subject identification information included in the generation instruction are set in both the items of the attention photographing position information and attention object candidate of the new attention object data.

As described above, the imaging device 1 can identify the position of the attention object on the image based on the attention object identification information. That is, when a current position is the same as a position that has previously been photographed, an imaging range to be photographed by a user includes the same subject as that has previously been photographed. When the number of times of photographing performed for the subject is large, it is highly likely that the subject that the user pays attention to and photographs is the same as that has previously been photographed at the past position. Thus, by identifying the same subject as that has previously been photographed frequently at the past position as the attenuation object in the current photographing position, the imaging device 1 can grasp the attention object.

The technology for grasping the attention object can be applied to various technical fields. For example, focusing and zooming on the attention object can be made automatically. Further, a portion which is out of focus can be blurred.

FIGS. 5A, 5B, 5C, and 5D are views illustrating an example of a flow of attention object output processing. (1) is an example in which a user photographs an area including "dog" and "tree" as photographing targets at "Nishi-kusatsu, Kusatsu-shi, Shiga". (2) is a part of the photographing history list, which illustrates some items included in the photographing history data.

A history corresponding to the example (1) appears at the uppermost row of the list. Specifically, photographing history data, in which "Nishi-kusatsu, Kusatsu-shi, Shiga" is set as the position information upon photographing, and "dog" and "tree" are set as the subject recognition information is added to the photographing history list. Data of second and subsequent rows are much older histories. For example, the photographing history data of the first to third rows are the same in photographing position and partially the same in subject.

(3) is a part of the attention object list, and is generated based on the photographing history list of (2). Specifically, three photographing history data including the "Nishi-kusatsu, Kusatsu-shi, Shiga" as the position information upon photographing are included in the photographing history list, so that the "Nishi-kusatsu, Kusatsu-shi, Shiga" is set as the attention photographing position information. As the subject identification information, "dog" and "tree" are included in the photographing history data of the first row, "dog" and "person A" are included in the photographing history data in the second row, and "dog", "car", "person A", and "tree" are included in the photographing history data of the third row, so that "dog", "car", "person A", and "tree" are set as the attention object candidate identification information.

The number of times of photographing performed for "dog" is the largest in the three photographing history data, the number of times of photographing for "person A" is the second largest, and the number of times of photographing for "car" is the third largest. Thus, the priority is set in ascending order of the number of times of photographing, and the highest priority is set for "dog", the second highest priority is for "person A", and the highest third priority is for "car" and "tree". Then, the generated attention object data is added to the attention object list. In this example, the generated attention object data is added to the uppermost row of the attention object list.

(4) is an example in which a user takes "dog", "person A", "car", and "tree" as photographing targets at "Nishi-kusatsu, Kusatsu-shi, Shiga" shown in (1), and photographs an area including "dog", "person A", "car", and "tree" as photographing targets. Since the attention object data in which "Nishi-kusatsu, Kusatsu-shi, Shiga" is set as the attention photographing position information is generated in (3), this attention object data is referred to while the through image is being displayed. Therefore, in the through image, "dog" having the highest priority in the attention object data being referred to is identified as the attention object. In this example, a circle is added on "dog" to indicate that "dog" is identified as the attention object.

Figure 6:
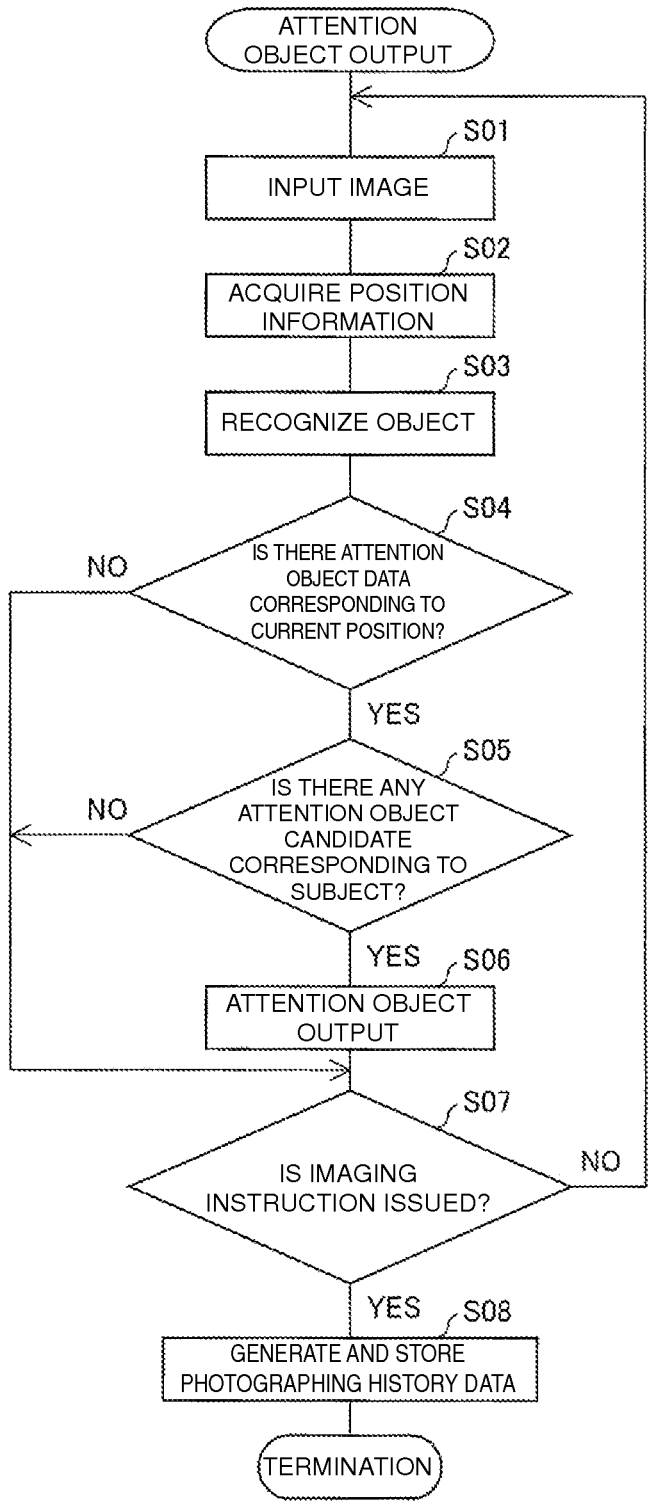
FIG. 6 is a flowchart illustrating an example of a flow of the attention object output processing.

FIG. 6 is a flowchart illustrating an example of a flow of the attention object output processing. When executing the attention object output processing, the controller 101 executes an attention object output program stored in the storage section 50. The image input section 111 receives the through image that the image sensor 10 outputs at a predetermined time interval (step S01).

In step S02, the position information acquisition section 113 receives the GPS signal output from the GPS sensor 90, thereby acquiring position information indicating a current position.

In step S03, the object recognition section 117 recognizes a subject in the through image received in step S01. When a plurality of subjects are included in the through image, all the subjects are recognized.

In step S04, the position information comparison section 131 determines whether or not attention object data corresponding to a current position is stored in the storage section 50. Specifically, the position information comparison section 131 determines whether or not attention object data including the same attention photographing position information as the position information acquired in step S02 is stored in the storage section 50. When the attention object data including the same attention photographing position information as the position information acquired in step S02 is stored, the processing flow proceeds to step S05; otherwise, the processing flow proceeds to step S07.

In step S05, the object comparison section 133 determines whether or not there is any attention object candidate corresponding to the subject. Specifically, the object comparison section 133 determines whether or not the attention object candidate included in the attention object data corresponding to a current position is coincides with the subject recognized in step S03, the attention object data being acquired in step S04. In this comparison between the attention object candidate and subject, when the attention object candidate identification information and subject identification information coincide with each other, the object comparison section 133 determines "match"; otherwise, the object comparison section 133 determines "mismatch".

When a plurality of subjects are recognized in step S03, and when a plurality of pieces of the attention object candidate identification information are included in the attention object data including the same attention photographing position information as the position information acquired in step S02, the subject identification information of each of the plurality of subjects and plurality of pieces of the attention object candidate identification information are compared. In this comparison, when a plurality of sets of the subject identification information and attention object candidate identification information coincide with each other, a subject that coincides with attention object candidate identification information having the highest priority of all the attention object candidate identification information coinciding with the subject identification information is identified as the attention object.

In step S05, when there is any attention object candidate corresponding to the subject, the found subject is identified as the attention object, and the processing flow proceeds to step S06; otherwise, the processing flow proceeds to step S07.

In step S06, the attention object output section 123 outputs, as the attention object identification information, the subject identification information of a subject coinciding with the attention object candidate in S05 and subject position information indicating a position of the subject on an image.

In step S07, the controller 101 determines whether or not imaging has been performed. When the imaging signal is input from the operation section 80, the processing flow proceeds to step S08; otherwise, the processing flow returns to step S01.

In step S08, the photographing history generation section 115 generates the photographing history data and adds the generated photographing history data to the photographing history list 51 stored in the storage section 50. Specifically, the photographing history generation section 115 generates the photographing history data in which date/time at which the photographing is performed in step S07 is set in the item of photographing date/time, position information acquired in step S02 upon photographing is set in the item of position information upon photographing, and subject identification information of a subject recognized in step S03 upon photographing is set in the item of subject identification information and terminates this attention object output processing.

Figure 7:
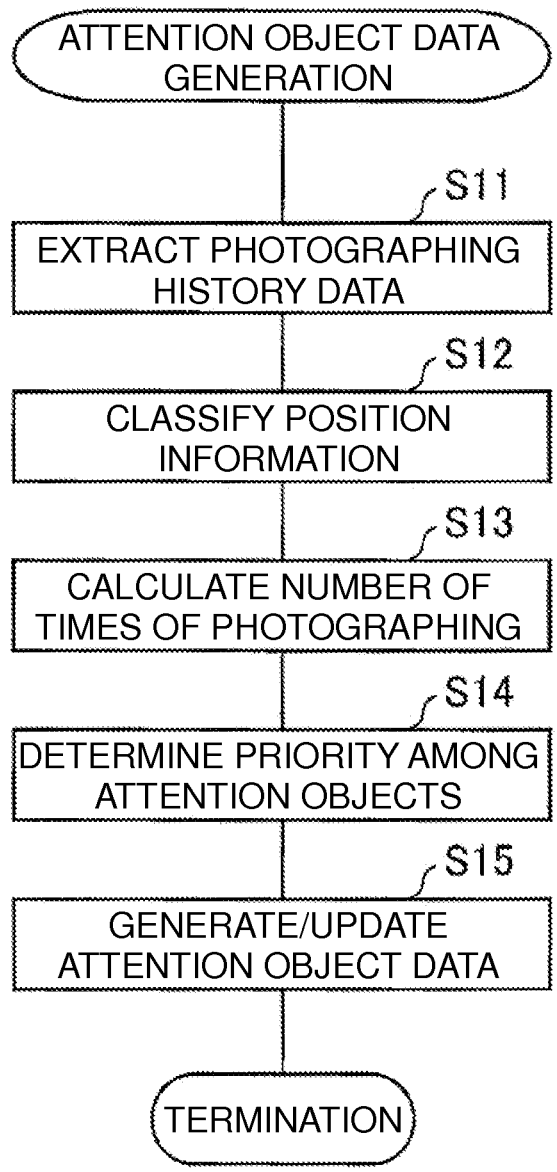
FIG. 7 is a flowchart illustrating an example of attention object data generation processing.

FIG. 7 is a flowchart illustrating an example of attention object data generation processing. The attention object data generation processing is executed every time the photographing history data is generated in the attention object output processing. The attention object list management section 121 extracts the photographing history data stored in the step S08 from the storage section 50 (step S11).

In step S12, the position information classification section 141 extracts, from the photographing history data extracted in step S11, the position information upon photographing, and when there is attention object data including the extracted position information upon photographing, extracts the attention object data as an update target. When there is no attention object data including the extracted position information upon photographing extracted from the photographing history data, the attention object list management section 121 newly generates the attention object data. Here, it is assumed that there is attention object data including the position information upon photographing extracted from the photographing history data.

In step S13, the photographing frequency calculation section 143 calculates the number of times of photographing. The photographing frequency calculation section 143 extracts all the photographing history data including the same position information upon photographing from the photographing history list 51 stored in the storage section 50 and sets the extracted photographing history data as processing targets. Then, the photographing frequency calculation section 143 calculates the number of times of photographing performed for the same subject based on the extracted photographing history data as processing targets. The photographing frequency calculation section 143 determines that the same subject has the same subject identification information, and the photographing frequency calculation section 143 calculates, as the number of times of photographing, the number obtained by increasing a count value by 1 every time coincidence of the subject identification information is found. The photographing frequency calculation section 143 associates the subject identification information and number of times of photographing for each subject identification information.

In step S14, the attention object priority determination section 145 assigns a higher priority to each of the subject identification information with a larger number of times of photographing calculated in step S13.

In step S15, the attention object data generation/update section 147 updates the attention object data set as the update target in step S12 and terminates the attention object data generation processing. Specifically, the attention object data generation/update section 147 sets the subject identification information included in the photographing history data set as the update target in step S12 in the item of the attention object candidate identification information and sets the priority set for each of the subject identification information in step S14 in the item of the priority, thereby updating the update target attention object data.

As described above, the imaging device 1 according to the first embodiment of the present invention includes the image input section 111 that receives image data including a subject that the image sensor 10 for imaging the subject outputs, position information acquisition section 113 that acquires position information indicating a current position, object recognition section 117 that recognizes the subject in the image data input from the image input section 111, attention object list management section 121 that manages, for each position upon photographing, the attention object list 53 including attention object data indicating an attention object candidate selected from among the subjects recognized in the image data that has previously been photographed at the position upon photographing, attention object identification section 119 that performs comparison between the attention object data corresponding to a position indicated by the position information acquired by the position information acquisition section 113 and subject recognized by the object recognition section 117, and when the subject and attention object candidate coincide with each other, identifies the subject coinciding with the attention object candidate as an attention object, and attention object output section 123 that outputs information for identifying, on an image, the attention object identified by the attention object identification section 119.

Thus, when the subject and attention object candidate coincide with each other in the above comparison, the subject coinciding with the attention object candidate is identified as the attention object. In a case where a current position is the same as a position that has previously been photographed, it is likely that the subject that the user photographs is the same as that has previously been photographed at the past position. Thus, by identifying the same subject as that has previously been photographed at the past position as the attenuation object, it is highly likely that the subject that the user pays attention to and photographs can be identified. Thus, the imaging device 1 can grasp the attention object.

In the first embodiment, the photographing frequency calculation section 143 may adjust the number of times of photographing in accordance with attention degree determined by at least one of a state of the subject and frequency of appearance of the subject. Specifically, the photographing frequency calculation section 143 determines the attention degree based on the subject identification information such as a size of the subject on an image, a position thereof on the image, a time length, continuity, and direction. The photographing frequency calculation section 143 adds "1×weighting factor (times)" to the number of times of photographing, the weighting factor being increased as the attention degree becomes higher.

The size of the subject, position thereof on the image, and direction thereof each correspond to the state of the subject. On the other hand, the time length during which the subject appears in a moving image, continuity of the subject in images obtained by continuous photographing each correspond to the frequency of appearance of the subject.

For the size of the subject, as a proportion of the area of the subject to the entire image is higher, the attention degree may be made higher. For the position of the subject on the image, as the subject is closer to a center of the image, the attention degree may be made higher. In this case, the position of the subject is grasped based on the attention object position information. Further, for the time length, as the number of frames constituting the moving image is larger, the attention degree may be made higher. For the direction of the subject, the higher frontality of "face" and "body" (assuming that the subject is a person), the higher the attention degree should be. For the continuity of the subject in images obtained by continuous photographing, as the number of times of continuous photographing for the subject is larger, the attention degree may be made higher.

For example, the photographing frequency calculation section 143 counts up the number of times of photographing by "1×2 (weighting factor)" for a subject whose attention degree is equal to or higher than a predetermined threshold and counts up the number of times of photographing by "1×1 (weighting factor)" for a subject whose attention degree is lower than the predetermined threshold.

Further, in the first embodiment, a subject associated with the highest priority of all the subjects coinciding with the attention object candidate identification information of the attention object data is identified as the attention object; however, the present invention is not limited to this, and it is possible to identify the same subject identification information as top two attention object candidate identification information in terms of the priority. Further, when attention object candidate identification information having the same priority and a plurality of pieces of subject identification information coincide respectively, it is possible to identify each of the plurality of pieces of subject identification information as the attention object.

When there is no attention object data including the same information as that of a current photographing position, it is possible to utilize map information to find attention object data including the attention photographing position information indicating a position (specifically, a position closest to the current photographing position within a predetermined distance therefrom) near a current photographing position and identify the attention object based on the found attention object data.

Further, when a subject that is not recognized at the past photographing position is recognized at a current photographing position, the subject may also be identified as the attention object. Specifically, when a subject corresponding to subject identification information included in the attention object data including the same attention photographing position information as the current photographing position and a subject corresponding to subject identification information not included in the attention object data are recognized, a subject corresponding to subject identification information associated with the highest priority and a subject corresponding to subject identification information not included in the attention object data are identified as the attention object.

FIG. 10 is a view explaining a photographed subject and a subject identified as the attention object. In this example, attention object data A is stored in the storage section 50, in which "Nishi-kusatsu, Kusatsu-shi, Shiga" is set as the attention photographing position information, "person A", "person B", and "person C" are set as the attention object candidate identification information, and in which "person A" has the highest priority, "person B" has the second highest priority, and "person C" has the third highest priority.

Since "Nishi-kusatsu, Kusatsu-shi, Shiga" which is the same position as for the attention object is set in common among items (1) to (7), the attention object data A is referred to upon photographing. For example, in items (1) to (6), a subject associated with the highest priority among all the subjects coinciding with the attention object candidate is identified as the attention object. In an item (7), "person A", "person B", "person C", and "person D" appear as the subject, and "person D" is a subject not included in the attention object data. In other words, "person D" is a subject that has never been photographed at "Nishi-kusatsu, Kusatsu-shi, Shiga". When photographing is performed under conditions of the item (7), "person A" which is the subject with the highest priority among all the subjects coinciding with the attention object candidate and "person D" not included in the attention object data are identified as the attention object.

Second Embodiment

Figure 8:
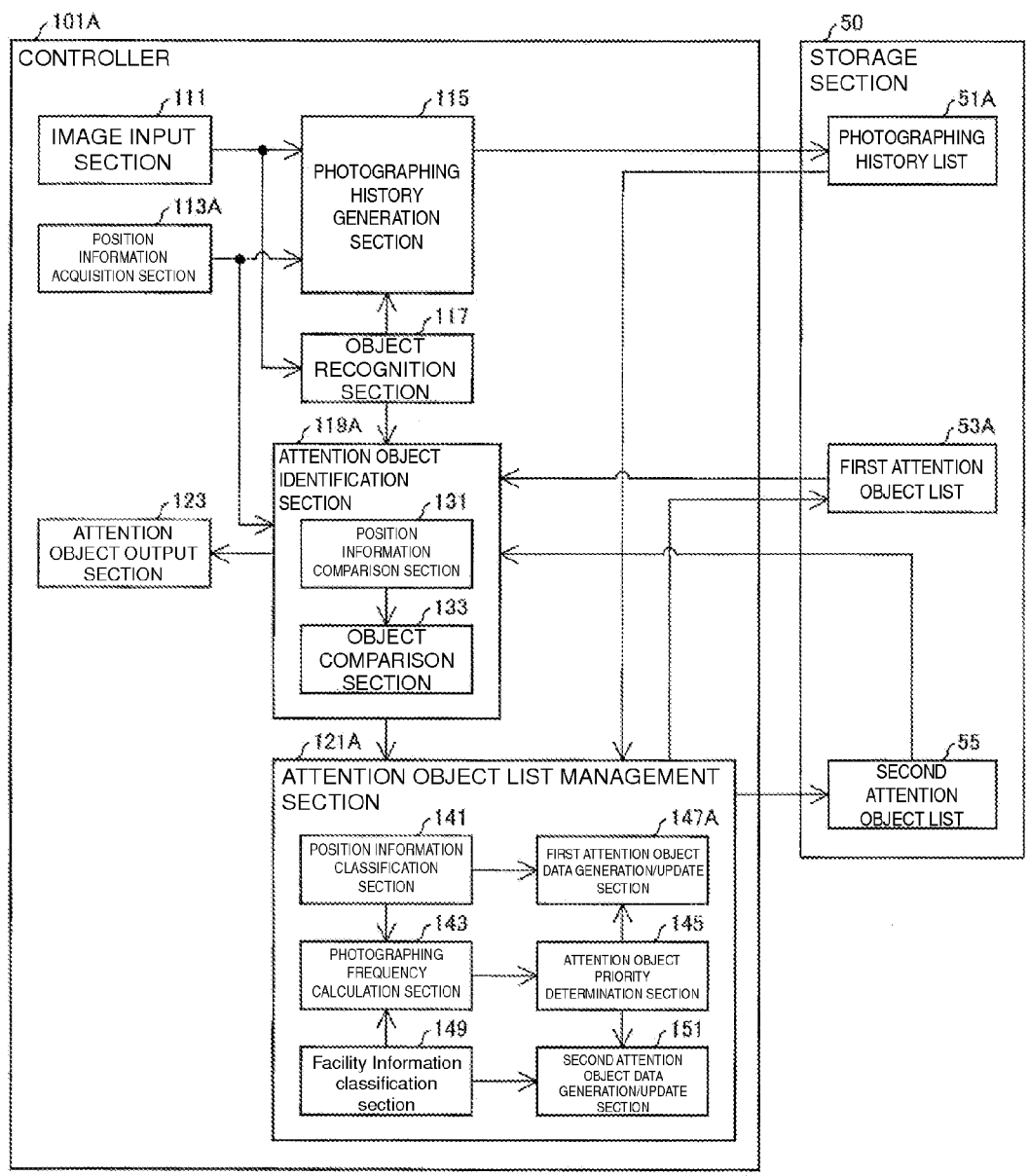
FIG. 8 is a block diagram illustrating, together with data stored in a storage section, an example of functions of a controller in a second embodiment.

In a second embodiment, facility information on a facility existing at a position identified by the GPS signal is included in the photographing history list for storage. FIG. 8 is a block diagram illustrating, together with data stored in a storage section, an example of functions of a controller in the second embodiment.

A controller 101A of FIG. 8 differs from the controller 101 of FIG. 2 in that the controller 101A includes a position information acquisition section 113A, an attention object list management section 121A, and an attention object identification section 119A in place of the position information acquisition section 113, attention object list management section 121, and attention object identification section 119, respectively. The following description mainly focuses on differences between the controller 101A of FIG. 8 and controller 101 of FIG. 2.

The position information acquisition section 113A acquires a GPS signal output from a GPS sensor 90 and facility information on a facility existing at a position identified by a GPS signal. For example, the position information acquisition section 113A stores map information and facility information associated with a position on a map and acquires, based on the map information and facility information, facility information corresponding to a position identified by the GPS signal. The facility information is information indicating a type of the facility, such as "station" or "convenience store".

When the position information acquisition section 113A is not storing the facility information corresponding to a position identified by the GPS signal, it does not acquire the facility information.

The facility information acquired by the position information acquisition section 113A is included in the photographing history data, and the resultant photographing history data is added to a photographing history list 51A stored in the storage section 50. In this case, the photographing history data newly includes an item of the facility information, in which the facility information is set.

FIG. 11 is a view explaining an example of the photographing history data in the second embodiment. As illustrated in FIG. 11, the item of the facility information in which the facility information is set is added to the photographing history data in the first embodiment. The facility information is set in the item of the facility information when the position information acquisition section 113A acquires the facility information together with the position information.

The attention object list management section 121A generates first attention object data and second attention object data based on the photographing history data and adds the first and second attention object data to a first attention object list 53A and a second attention object list 55, respectively. The first attention object data is identical with the attention object data of FIG. 4, so that description thereof is omitted. The second attention object data includes a second attention object record associating attention facility information, attention object candidate identification information, and priority.

The second attention object record includes an item of the attention facility information, an item of the attention object candidate identification information, and an item of the priority. In the item of the attention facility information, facility information upon photographing included in the photographing history data is set as a single attribute. In the item of the attention object candidate identification information, the subject identification information associated with the facility information upon photographing is set. When a plurality of pieces of subject identification information are set in the item of the attention object candidate identification information, priority orders determined for respective subject identification information are set in the item of the priority.

FIG. 12 is a view explaining an example of the attention object data in the second embodiment. As illustrated in FIG. 12, the attention object data in the second embodiment includes the item of the attention facility information in place of the attention position information. In the item of the attention facility information, facility information included in the item of the facility information of the photographing history data is set as a single attribute. In the item of the attention object candidate identification information, the subject identification information associated with the facility information is set. When a plurality of pieces of subject identification information are set in the item of the attention object candidate identification information, priority orders determined for respective subject identification information are set in the item of the priority.

The attention object list management section 121A includes a position information classification section 141, a facility information classification section 149, a photographing frequency calculation section 143, an attention object priority determination section 145, a first attention object data generation/update section 147A, and a second attention object data generation/update section 151. The first attention object data generation/update section 147A is identical with the attention object data generation/update section 147 of FIG. 2, so that description thereof is omitted.

The facility information classification section 149 extracts, from the photographing history list 51A stored in the storage section 50, the photographing history data of date/time included in the entry instruction as a processing target, and compares the facility information upon photographing included in the extracted photographing history data and the second attention object list 55. When there exists attention object data including the same attention facility information as the facility information upon photographing included in the processing target photographing history data, the facility information classification section 149 includes, as an update target, the attention object data in an update instruction and outputs the update instruction to the second attention object data generation/update section 151. At the same time, the facility information classification section 149 outputs the photographing frequency calculation instruction at update time including the processing target photographing history data to the photographing frequency calculation section 143.

On the other hand, when there is no attention object data including the same attention facility information as the facility information upon photographing included in the processing target photographing history data, the facility information classification section 149 outputs a generation instruction including the processing target photographing history data to the second attention object data generation/update section 151. At the same time, the facility information classification section 149 outputs the photographing frequency calculation instruction at generation time including the processing target photographing history data to the photographing frequency calculation section 143.

The photographing frequency calculation section 143 extracts all the photographing history data including the facility information upon photographing from the photographing history list 51A stored in the storage section 50, sets each extracted photographing history data as a processing target and calculates the number of time of photographing for each subject identification information included in the processing target photographing history data, and the attention object priority determination section 145 assigns a higher priority to each of the subject identification information with a larger number of times of photographing.

Upon receiving the update instruction from the facility information classification section 149 and receiving the subject identification information and priority from the attention object priority determination section 145, the second attention object data generation/update section 151 updates the attention object data identified by the update instruction.

Further, upon receiving the generation instruction from the facility information classification section 149, the second attention object data generation/update section 151 newly generates the second attention object data and adds the generated second attention object data to the second attention object list 55 stored in the storage section 50. The facility information upon photographing and subject identification information included in the generation instruction are set in each of the items of the attention facility information and attention object candidate of the newly generated second attention object data.

The attention object identification section 119A uses one of the first and second attention object lists 53A and 55 to identify the attention object. In the second embodiment, one of the first and second attention object lists 53A and 55 is selected according to a user's instruction, and the selected list is used to identify the attention object. The identification method for the attention object is the same as the method used by the attention object identification section 119, so that description thereof is omitted.

Even through a user takes photographs at different positions, there may be a case where he or she photographs the same object as the attention object when the facility is the same. For example, there can be considered a case where the user photographs various electric trains at stations around the country. According to the second embodiment, the photographing history list arranged with the same facility type is used to generate the second attention object list 55. Thus, when there is a need to identify the attention object based on the facility, the user inputs an instruction to select the second attention object list 55 to the controller 101A to thereby allowing the controller 101A to execute facility-based identification of the attention object. As a result, a subject that has previously been photographed frequently at the same facility is identified as the attention object.

Third Embodiment

In a third embodiment, in addition to the generation of the attention object list 53, a combined attention object list is generated by combining the photographing history list of a first user and that of a second user.

Figure 9:
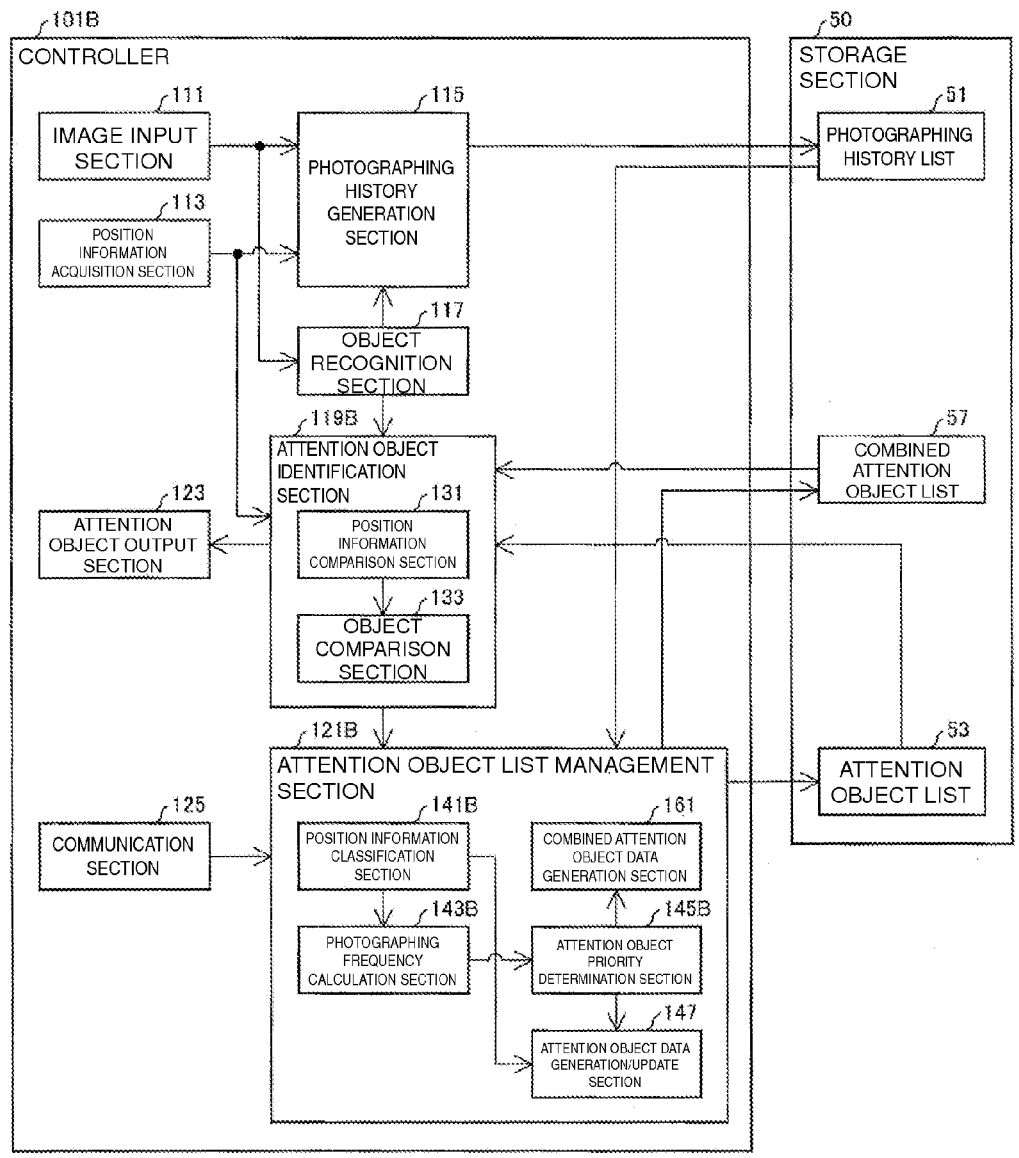
FIG. 9 is a block diagram illustrating, together with data stored in a storage section, an example of functions of a controller in a third embodiment.

FIG. 9 is a block diagram illustrating, together with data stored in a storage section, an example of functions of a controller in a third embodiment. A controller 101B of FIG. 9 differs from the controller 101 of FIG. 2 in that the controller 101B includes an attention object list management section 121B in place of the attention object list management section 121, a communication section 125, and an attention object identification section 119B in place of the attention object identification section 119. Other functions are the same as those of the controller 101 of FIG. 2, so that the following description mainly focuses on the different points. The generation of the attention object list 53 has been described above, so that description thereof is omitted.

Upon receiving, from the communication section 125, the photographing history list of the second user that the communication section 125 acquires from another (second) imaging device 1, the attention object list management section 121B combines the photographing history list 51 stored in the storage section 50 and photographing history list of the second user received from the communication section 125.

Figure 13:
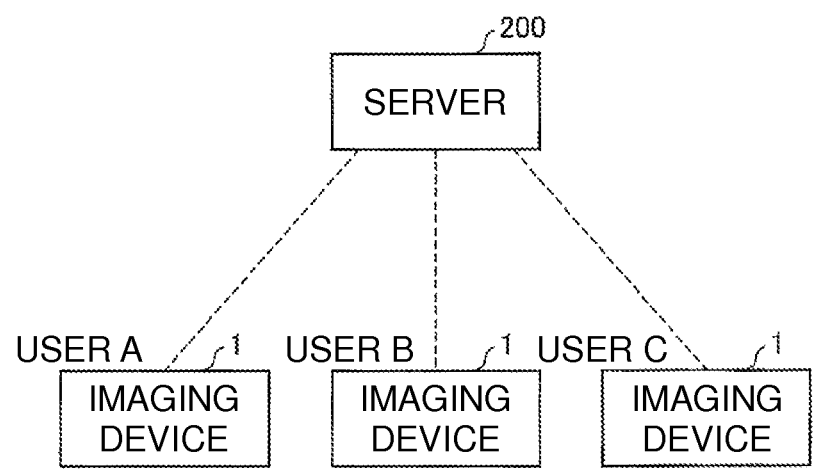
FIG. 13 is a view illustrating an example of a photographing history data transmission/reception system.

The communication section 125 may acquire the photographing history list of the second user managed by a server 200 illustrated in FIG. 13 by communicating with the server 200. The server 200 acquires, on a point-by-point basis, the photographing history list from the imaging device 1 owned by the users and manages them.

The photographing history list stored in the storage section 50 is referred to as a first photographing history list, photographing history data included in the first photographing history list is referred to as first photographing history data, photographing history list of the second user received from the communication section 125 is referred to as a second history list, and photographing history data included in the second photographing history list is referred to as second photographing history data.

The attention object list management section 121B includes a position information classification section 141B, a photographing frequency calculation section 143B, an attention object priority determination section 145B, and a combined attention object data generation section 161.

The position information classification section 141B classifies the first and second photographing history data based on the position information upon photographing. Specifically, the position information classification section 141B extracts, from the first and second photographing history lists, photographing history data including the same position information upon photographing and groups the extracted photographing history data as a group having the same position. The position information classification section 141B performs the grouping for all the photographing history data included in the first and second photographing history list and outputs a photographing frequency calculation instruction including the grouped photographing history data to the photographing frequency calculation section 143B.

In response to the photographing frequency calculation instruction from the position information classification section 141B, the photographing frequency calculation section 143B calculates the number of times of photographing for each subject. Specifically, upon receiving the photographing frequency calculation instruction from the position information classification section 141B, the photographing frequency calculation section 143B calculates the number of times of photographing performed for the same subject. The photographing frequency calculation section 143B generates, for each subject identification information, a photographing frequency set including the subject identification information and number of times of photographing and then generates a photographing frequency group including all the photographing frequency sets generated for the same position group and position information upon photographing included in the same position group. The photographing frequency calculation section 143B generates the photographing frequency group for each of the same position groups generated by the position information classification section 141B and outputs a priority determination instruction including the generated photographing frequency group to the attention object priority determination section 145B.

The attention object priority determination section 145B determines the priority among the attention object candidates. Specifically, the attention object priority determination section 145B assigns a higher priority to the photographing frequency set included in the photographing frequency group with a larger number of times of photographing. The attention object priority determination section 145B generates a priority set including the subject identification information included in the photographing frequency set and the priority assigned to the photographing frequency set for each of the photographing frequency sets included in the photographing frequency group. Then, the attention object priority determination section 145B generates, for each of the photographing frequency groups generated by the photographing frequency calculation section 143B, a priority group including the generated priority set and position information upon photographing included in the photographing frequency group and outputs a combined object date generation instruction including the generated priority group to the combined attention object data generation section 161.

Upon receiving the combined object date generation instruction from the attention object priority determination section 145B, the combined attention object data generation section 161 generates combined attention object data based on the priority group. Specifically, the position information upon photographing, subject identification information, and priority which are included in the priority group are set in each of the items of attention photographing position information, attention object candidate identifications information, and priority. The combined attention object data generation section 161 generates the combined attention object data for each of the priority groups generated by the attention object priority determination section 145B and stores a combined attention object list 57 including the generated combined attention object data in the storage section 50.

Which one of the attention object list 53 and combined attention object list 57 is used for identification of the attention object may be determined by the attention object identification section 119B according to a user setting. For example, at a first-visited sightseeing spot, a user often photographs, as the subject, an object that has been frequently photographed by others at the same spot. In this case, according to one or more embodiments of the present invention, the combined attention object list 57 is selected.

In generating the combined attention object data, specific attention object identification information may be excluded. The specific attention object candidate identification information is, attention object candidate identification information indicating, e.g., "person".

[Implementation Example Using Software]

Control blocks (especially, controller 101, 101A, or 101B) of the imaging device 1 may be implemented using a logic circuit (hardware) formed on an integrated circuit (IC chip) or implemented in a software manner using a CPU (Central Processing Unit).

In the latter case, the imaging device 1 includes a CPU that executes instructions of a program for realizing each function, a ROM (Read Only Memory) or a storage device (which are collectively referred to as "recording medium") in which the program and various data are recorded in a computer (or CPU)-readable manner, and a RAM (Random Access Memory) that runs the program. The computer (or CPU) reads out the program from the recording medium and executes it. Examples of the recording medium include "non-transitory physical recording media", such as a tape, a disk, a card, a semiconductor memory, and a programmable logic circuit. Further, the program may be installed to the computer through any transmission medium (communication network or broadcast wave, etc.) that can transmit the program. One or more embodiments of the present invention can be realized also in a form of a data signal embedded in a carrier wave by which the program is concreted as electronic transmission.

The present invention is not limited to the above embodiments, but may be variously modified within the scope of the claims. Embodiments based on a proper combination of technical ideas disclosed in different embodiments are encompassed in the technical scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processor comprising:
   an image input section that receives image data output from an imaging unit for imaging a subject, the image data including the subject;
   a position information acquisition section that acquires position information indicating a current position;
   an object recognition section that recognizes the subject in the image data input from the image input section;
   an attention object list management section that manages, for each position upon photographing, a first attention object list including first attention object data indicating an attention object candidate selected from among the subjects recognized in the image data that is previously photographed at the position upon photographing;
   an attention object identification section that performs comparison processing of comparing the first attention object data corresponding to a position indicated by the position information acquired by the position information acquisition section and subject recognized by the object recognition section and to identify, when the subject and the attention object candidate coincide with each other, the subject coinciding with the attention object candidate as an attention object; and
   an attention object output section that outputs information for identifying, on an image, the attention object identified by the attention object identification section.

2. The image processor according to claim 1,
   wherein, when selecting, as the attention object candidate, a plurality of the subjects from among all the subjects recognized in previously photographed image data, the attention object list management section assigns priorities to each of the attention object candidates for management, and
   wherein the priority is set based on the number of times of recognition indicating the number of times that the subject is recognized in the previously photographed image data.

3. The image processor according to claim 2,
   wherein the attention object list management section adjusts the number of times of recognition in accordance with attention degree determined by at least one of a state of the subject and frequency of appearance of the subject and sets the priority based on the adjusted number of times of recognition.

4. The image processor according to claim 2,
   wherein, when there exist a plurality of the subjects each coincide with the attention object candidate of the first attention object data as a result of the comparison, the attention object identification section identifies, as the attention object, a plurality of the subjects that coincide with a top predetermined number of attention object candidates in terms of the priority.

5. The image processor according to claim 1,
   wherein, when there is no first attention object data corresponding to the position indicated by the position information acquired by the position information acquisition section, the attention object identification section:
     performs, as the comparison processing, processing of comparing the first attention object data corresponding to a position near the position indicated by the position information and subject recognized by the object recognition section, and
     identifies, when the attention object candidate included in the first attention object data coincides with subject, the subject coinciding with the attention object candidate as the attention object.

6. The image processor according to claim 2,
   wherein, when there exit subjects that coincide and do not coincide with the attention object candidate as a result of the comparison processing, the attention object identification section identifies, as the attention object, a subject that does not coincide with the attention object candidate in addition to a subject having the highest priority among a plurality of subjects that coincide with the attention object candidate.

7. The image processor according to claim 1,
   wherein the attention object list management section acquires an another user attention object list including position-based another user attention object data generated by another image processor and manages a combined attention object list obtained by combining the acquired another user attention object list and the first attention object list, and wherein, when the combined attention object list is selected according to a user instruction, the attention object identification section performs, as the comparison processing, processing of comparing the combined attention object data corresponding to a position indicated by the position information acquired by the position information acquisition section and subject recognized by the object recognition section, from the combined attention object list.

8. The image processor according to claim 7,
wherein the attention object list management section combines the another user attention object list and first attention object list after excluding a predetermined attention object candidate from the another user attention object list.

9. The image processor according to claim 1,
wherein the position information indicates a predetermined range centering on a position identified by a latitude and a longitude.

10. The image processor according to claim 1,
wherein the position information is indicated by a predetermined administrative section.

11. The image processor according to claim 1,
wherein the position information acquisition section acquires, in addition to the position information, facility information indicating a facility existing at a position indicated by the position information,
wherein, when the position information acquisition section acquires the facility information, the attention object list management section manages, for each facility information, a second attention object list including second attention object data indicating an attention object candidate selected from among the subjects recognized in the image data that is previously photographed at a position corresponding to the facility, and
wherein, when the position information acquisition section acquires the facility information, the attention object identification section performs, as the comparison processing, processing of comparing the second attention object data corresponding to the facility information and subject recognized by the object recognition section.

12. An image processing method comprising:
an image input step of receiving image data output from an imaging unit for imaging a subject;
a position information acquisition step of acquiring position information indicating a current position;
an object recognition step of recognizing the subject in the image data input in the image input step;
an attention object list management step of managing, for each position upon photographing, a first attention object list including first attention object data indicating an attention object candidate selected from among the subjects recognized in the image data that is previously photographed at the position upon photographing;
an attention object identification step of performing comparison processing of comparing the first attention object data corresponding to a position indicated by the position information acquired in the position information acquisition step and subject recognized in the object recognition step and to identify, when the subject and attention object candidate coincide with each other, the subject coinciding with the attention object candidate as an attention object; and
an attention object output step of outputting information for identifying, on an image, the attention object identified in the attention object identification step.

13. An image processing program stored on a non-transitory computer readable medium that causes computer to perform:
an image input step of receiving image data output from an imaging unit for imaging a subject;
a position information acquisition step of acquiring position information indicating a current position;
an object recognition step of recognizing the subject in the image data input in the image input step;
an attention object list management step of managing, for each position upon photographing, a first attention object list including first attention object data indicating an attention object candidate selected from among the subjects recognized in the image data that is previously photographed at the position upon photographing;
an attention object identification step of performing comparison processing of comparing the first attention object data corresponding to a position indicated by the position information acquired in the position information acquisition step and subject recognized in the object recognition step and to identify, when the subject and attention object candidate coincide with each other, the subject coinciding with the attention object candidate as an attention object; and
an attention object output step of outputting information for identifying, on an image, the attention object identified in the attention object identification step.

14. The image processor according to claim 3,
wherein, when there exist a plurality of the subjects each coincide with the attention object candidate of the first attention object data as a result of the comparison, the attention object identification section identifies, as the attention object, a plurality of the subjects that coincide with a top predetermined number of attention object candidates in terms of the priority.

15. The image processor according to claim 2,
wherein, when there is no first attention object data corresponding to the position indicated by the position information acquired by the position information acquisition section, the attention object identification section:
performs, as the comparison processing, processing of comparing the first attention object data corresponding to a position near the position indicated by the position information and subject recognized by the object recognition section, and
identifies, when the attention object candidate included in the first attention object data coincides with subject, the subject coinciding with the attention object candidate as the attention object.

16. The image processor according to claim 3,
wherein, when there is no first attention object data corresponding to the position indicated by the position information acquired by the position information acquisition section, the attention object identification section:
performs, as the comparison processing, processing of comparing the first attention object data corresponding to a position near the position indicated by the position information and subject recognized by the object recognition section, and
identifies, when the attention object candidate included in the first attention object data coincides with subject, the subject coinciding with the attention object candidate as the attention object.

17. The image processor according to claim 4,
wherein, when there is no first attention object data corresponding to the position indicated by the position information acquired by the position information acquisition section, the attention object identification section:
  performs, as the comparison processing, processing of comparing the first attention object data corresponding to a position near the position indicated by the position information and subject recognized by the object recognition section, and
  identifies, when the attention object candidate included in the first attention object data coincides with subject, the subject coinciding with the attention object candidate as the attention object.

18. The image processor according to claim 2,
wherein the attention object list management section acquires an another user attention object list including position-based another user attention object data generated by another image processor and manages a combined attention object list obtained by combining the acquired another user attention object list and the first attention object list, and
wherein, when the combined attention object list is selected according to a user instruction, the attention object identification section performs, as the comparison processing, processing of comparing the combined attention object data corresponding to a position indicated by the position information acquired by the position information acquisition section and subject recognized by the object recognition section, from the combined attention object list.

19. The image processor according to claim 3,
wherein the attention object list management section acquires an another user attention object list including position-based another user attention object data generated by another image processor and manages a combined attention object list obtained by combining the acquired another user attention object list and the first attention object list, and
wherein, when the combined attention object list is selected according to a user instruction, the attention object identification section performs, as the comparison processing, processing of comparing the combined attention object data corresponding to a position indicated by the position information acquired by the position information acquisition section and subject recognized by the object recognition section, from the combined attention object list.

20. The image processor according to claim 4,
wherein the attention object list management section acquires an another user attention object list including position-based another user attention object data generated by another image processor and manages a combined attention object list obtained by combining the acquired another user attention object list and the first attention object list, and
wherein, when the combined attention object list is selected according to a user instruction, the attention object identification section performs, as the comparison processing, processing of comparing the combined attention object data corresponding to a position indicated by the position information acquired by the position information acquisition section and subject recognized by the object recognition section, from the combined attention object list.

* * * * *